United States Patent [19]

McGrath

[11] 4,001,847

[45] Jan. 4, 1977

[54] OSCILLOSCOPE CAMERA

[75] Inventor: Neal McGrath, Alexandria, Va.

[73] Assignee: Illinois Nuclear Electronics, Inc., Addison, Ill.

[22] Filed: Sept. 2, 1975

[21] Appl. No.: 609,444

[52] U.S. Cl. .............................. 354/174; 354/76; 354/276

[51] Int. Cl.² ...................................... G03B 19/10

[58] Field of Search .......... 354/174, 175, 176, 177, 354/178, 179, 180, 181, 182, 183, 184, 185, 186, 275, 276, 277, 278, 279, 280, 281, 282, 283, 284, 285, 76, 77, 78; 346/110 R, 110 V; 355/20; 240/52.15

[56] References Cited

UNITED STATES PATENTS

| 3,136,207 | 6/1964 | Fleed et al. ................... 354/174 X |
| 3,277,240 | 10/1966 | Marjoran et al. .............. 346/110 R |
| 3,696,720 | 10/1972 | Vinson ............................ 354/76 X |
| 3,713,614 | 1/1973 | Taylor ....................... 240/52.15 X |

Primary Examiner—Edna M. O'Connor
Attorney, Agent, or Firm—Lockwood, Dewey, Zickert & Alex

[57] ABSTRACT

Camera for photographing an oscilloscope screen or a cathode-ray tube including a housing having a lens mounted therein with a first opening on one side of the lens for aligning with the oscilloscope screen and a second opening at the other side of the lens for receiving a film cassette. Magnetic means is provided for mounting the film cassette on the camera housing at the second opening including a strip of flexible or resilient magnet material about the opening and a strip of magnetic material on the film cassette.

8 Claims, 6 Drawing Figures

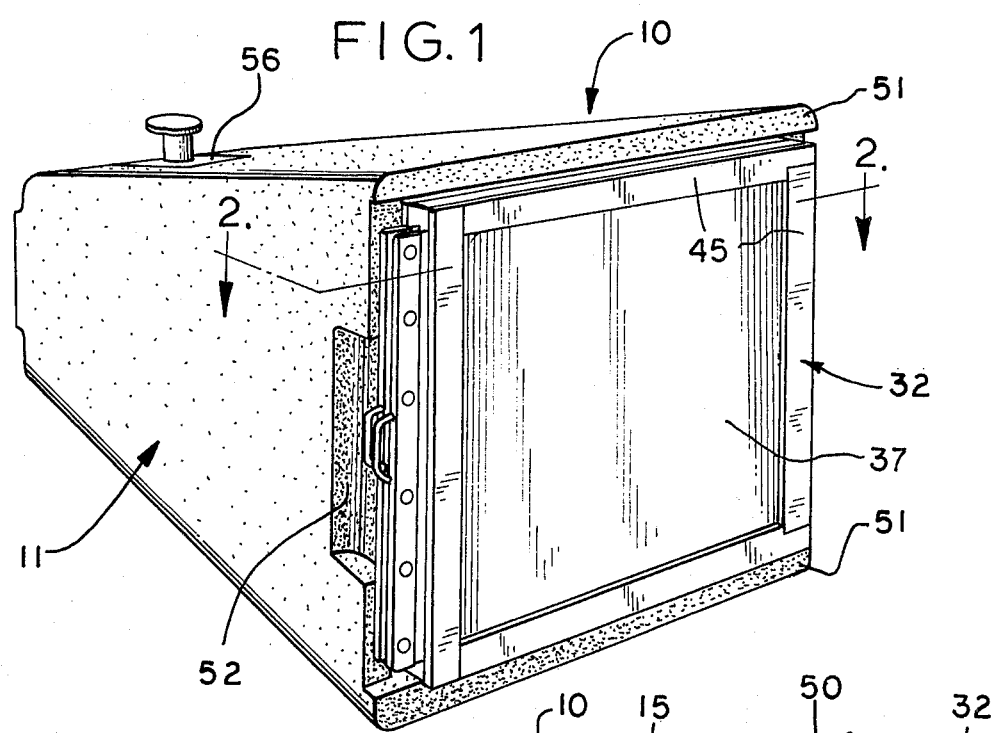
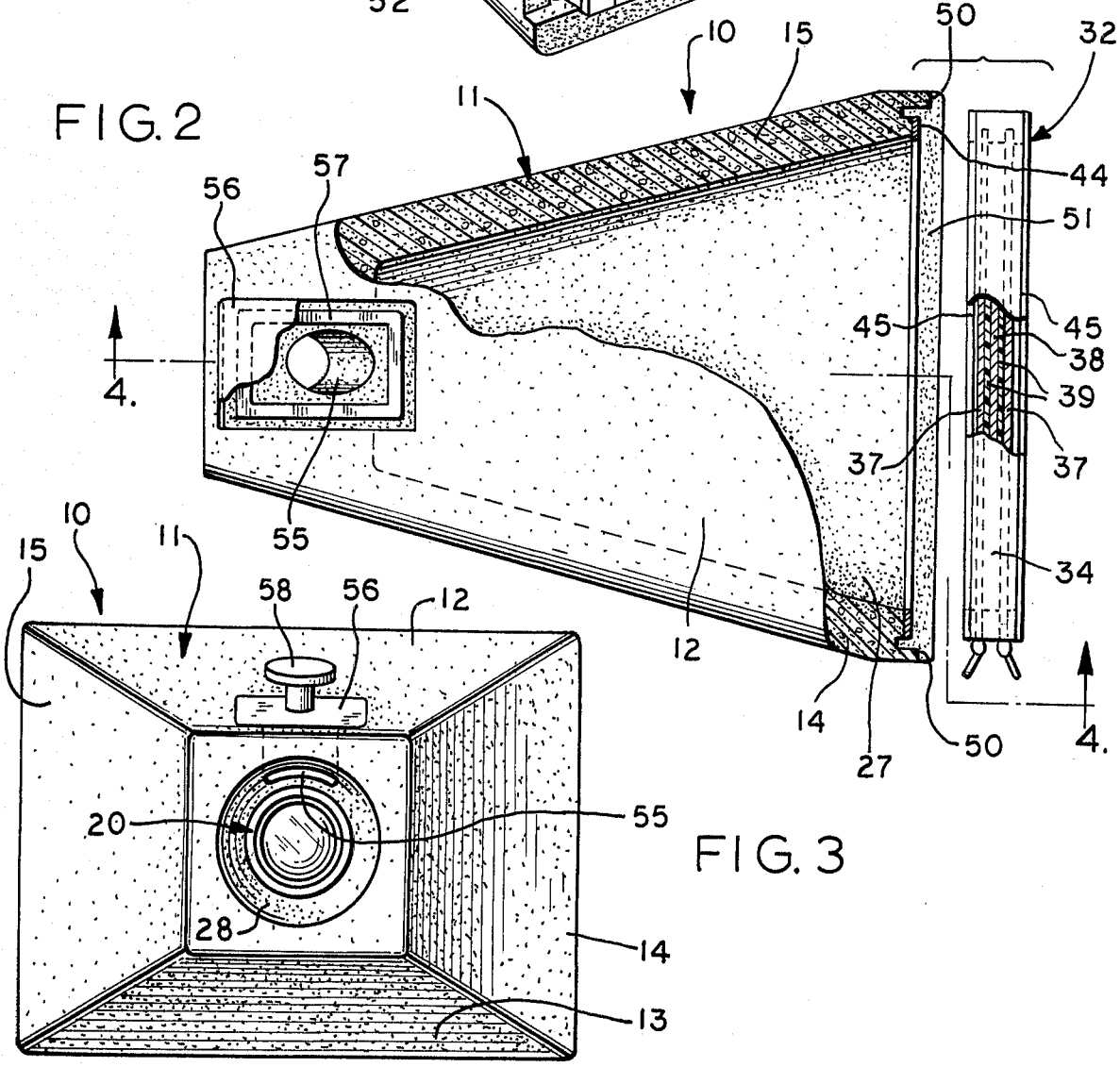

OSCILLOSCOPE CAMERA

This invention relates in general to a camera, and more particularly, to a camera adapted to photograph the output of a cathode-ray tube, and still more particularly, to magnetic means for mounting a film cassette on a camera.

Heretofore, it has been well known to utilize slot-type structures for mounting film cassettes on cameras. Further, it has been known to utilize felt material for sealing out light when mounting film cassettes on cameras. Wear on the felt disturbs the focal distance between the film plane and the object.

The present invention relates to a structure for mounting film cassettes onto cameras which eliminates the need for providing the usual cumbersome slot structure into which a film cassette may be inserted. Further, the present invention eliminates the need for utilizing felt as a light seal when mounting a film cassette to a camera. The present invention permits the quick and easy handling and mounting of film cassettes on the camera to speed up the photographic process. More particularly, the present invention concerns a film cassette mount that includes the use of a flexible magnet material in strip form in conjunction with a mating magnetic strip, wherein the flexible magnet material is mounted on the camera and the magnetic strip is mounted on the film cassette. It should be appreciated that the flexible magnet material could be mounted on the film cassette, and the magnetic material could be mounted on the camera. The coaction between the magnetic material and the flexible magnet material seals against light loss, while permitting easy and quick mounting of a film cassette to the camera.

It is therefore an object of the present invention to provide a new and improved mounting arrangement for mounting a film cassette on a camera that not only reduces the time needed for changing film cassettes but also assists in sealing the film cassette to the camera and preventing light loss.

Another object of the invention is in the provision of a mounting arrangement for mounting a film cassette onto a camera which assures a constant focal distance between the film plane and the object being photographed.

Other objects, features and advantages of the invention will be apparent from the following detailed disclosure, taken in conjunction with the accompanying sheets of drawings, wherein like reference numerals refer to like parts, in which:

FIG. 1 is a perspective view of the camera according to the invention and illustrating the film cassette in mounted position;

FIG. 2 is a top plan view of the camera of FIG. 1 with some parts broken away and other parts in section, wherein the section is taken substantially along line 2—2 of FIG. 1 and showing the film cassette in exploded relation to the camera;

FIG. 3 is a rear elevational view of the camera shown in FIG. 1;

Figure 4:
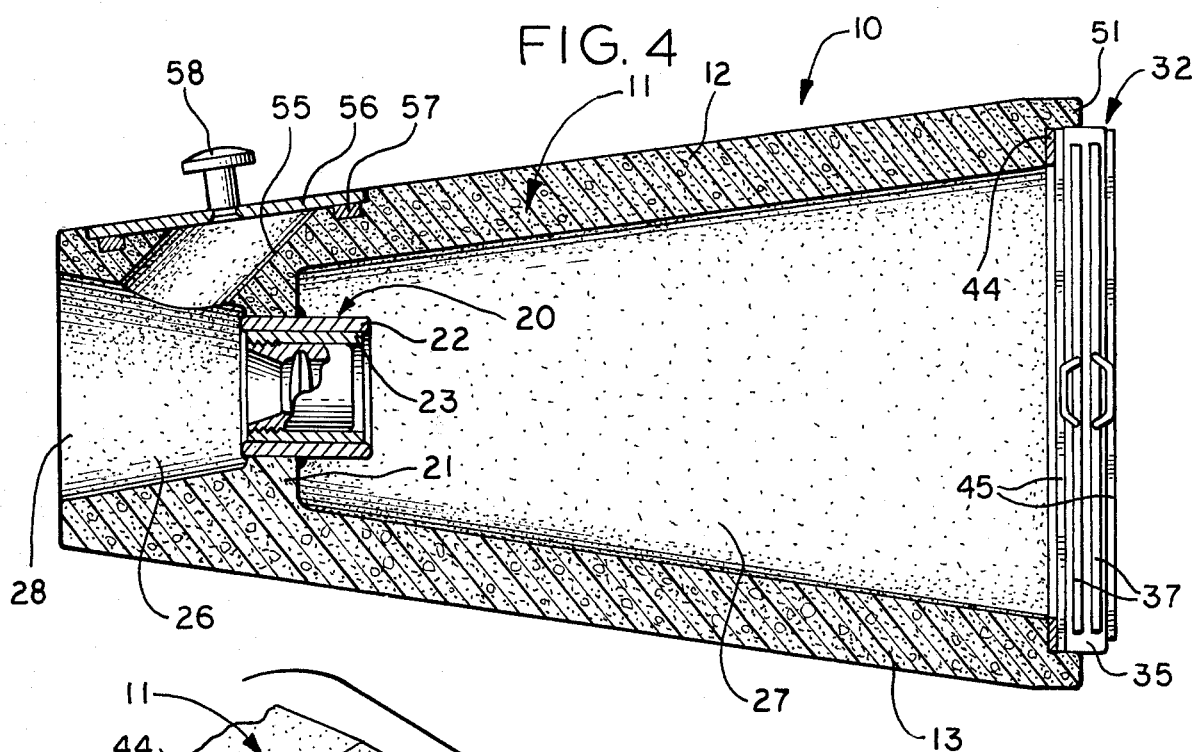
FIG. 4 is a vertical sectional view taken through the camera substantially along line 4—4 of FIG. 2 and showing the film cassette in mounted position.

The camera of the present invention is especially useful for photographing the output of a cathode-ray tube of an oscilloscope, which is also commonly known as an oscilloscope screen. However, it should be appreciated it could be used to photograph the output of any cathode-ray tube. More particularly, the camera of the invention is useful in nuclear medicine for recording a static or dynamic study of a patient for diagnostic purposes where the study is imaged on an oscilloscope screen. Plate film in film cassettes is utilized to receive and record the image from the oscilloscope screen in the photographic process of the camera of the invention. While any type of film may be used in the film cassette utilized with the camera of the invention, it is preferable to use X-ray film for obtaining substantial cost savings. Further, the X-ray film facilitates multi-image recording.

The camera of the invention is generally designated by the numeral 10, as shown in FIGS. 1 to 3, and includes a box or housing 11 made of one-piece molded construction of high-density polyurethane. The housing 11 includes upper and lower non-parallel, diverging walls 12 and 13 and opposed non-parallel, diverging side walls 14 and 15. The outer configuration of the walls is tapered from end to end.

Within the housing a lens system 20 is mounted closer to one end than the other in a partition 21. The lens system includes a fixed tubular member 22 slidably receiving therein a lens holder 23 that permits movement for focus purposes.

A first chamber 26 is defined at one side or end of the lens system 20, while a second chamber 27 is defined at the other side or end of the lens system in the housing 11. A first opening 28 is defined at one end of the housing in communication with the first chamber 26 and which is sized to mate with the oscilloscope screen of the oscilloscope. Accordingly, the picture on the oscilloscope screen is shielded in relation to the input side of the lens system 20. While not shown, suitable mounting means is provided on the oscilloscope for mounting the camera 10 directly thereto.

The second chamber 27 leads to the second opening 29 where a film cassette 32 is to be mounted. The opening 29 is much larger than the opening 28. Further, the chamber 27 gradually expands from the lens 20 to the opening 29. Similarly, the chamber 26 converges from the opening 28 to the lens. The film cassette 32 is conventional except for having mounted thereon means for coacting with means on the housing at the opening for mounting the cassette to the camera.

Figure 6:
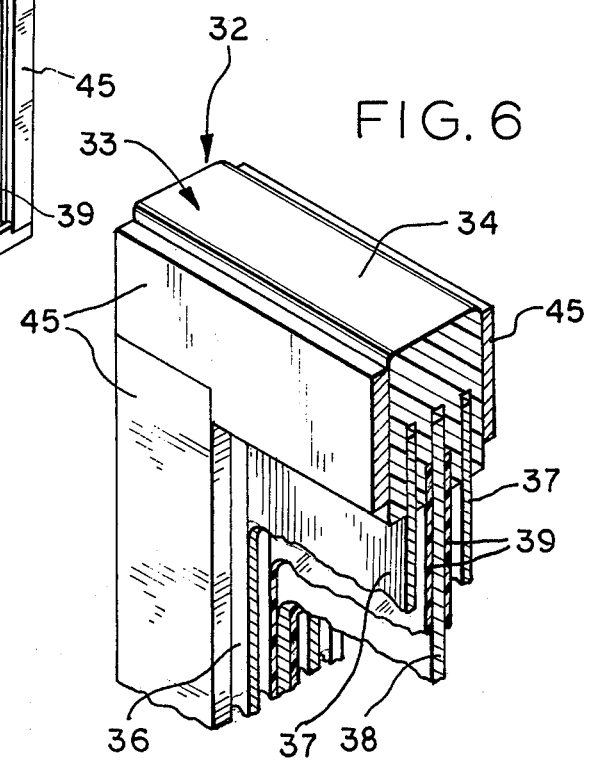
FIG. 6 is an enlarged detail sectional perspective view of a portion of the film cassette.

The cassette includes a rectangular frame 33 made of a suitable material such as plastic having upper and lower rails 34 and opposed side rails 35 and 36. The upper and lower rails are identical, while the side rail 35 essentially differs from the side rail 36 in that it includes slots for receiving a pair of dark slides 37. Additionally, the rail 35 will be constructed to handle removal and replacement of film. Arranged at the central portion of the film cassette frame is an opaque divider or partition 38, as seen in FIG. 6. X-ray plate film 39 is arranged on opposite sides of the opaque divider. The dark slides 37 slidably received by the frame 33 overlie the plate film 39. Suitable slots are provided in the frame for receiving the film and the dark slides, and suitable light seals are associated with the dark slides and the slots for receiving the dark slides to prevent exposure of the film during insertion or removal of the dark slides. Accordingly, the general construction of the film cassette is standard, but preferably the film cassette includes a pair of plate films as illustrated.

The mounting arrangement of the present invention for mounting the film cassette to the camera includes a strip 44 of magnet material suitably secured to the camera housing 11 around the opening 29, together with a strip 45 of magnetic material suitably secured to the opposite faces of the film cassette frame 33, wherein placement of the magnetic material 45 in engagement with the magnet material 44 causes gripping of the film cassette to the camera housing. The outer surfaces of the magnetic material 45 are coplanar about the frame of the film cassette. Similarly, the outer surfaces of the magnet material 44 are coplanar about the opening in the camera housing. It may be appreciated that the magnetic material 45 may be of a suitable metal, and it is important that the magnet material be flexible or resilient to seal against light penetration between the housing and the film cassette. Any suitable flexible magnet material may be used for the strip 44, such as rubber base ethylene polypropylene with barium ferride, which is commercially available. It should be further appreciated that the magnet material could be secured to the frame of the film cassette, while the magnetic material could be secured to the camera housing. It has been found that magnet material a 0.060 inch thickness and one-half inch width has been satisfactory. Preferably, the width of the metal stripping is about the same as the magnet material.

Figure 5:
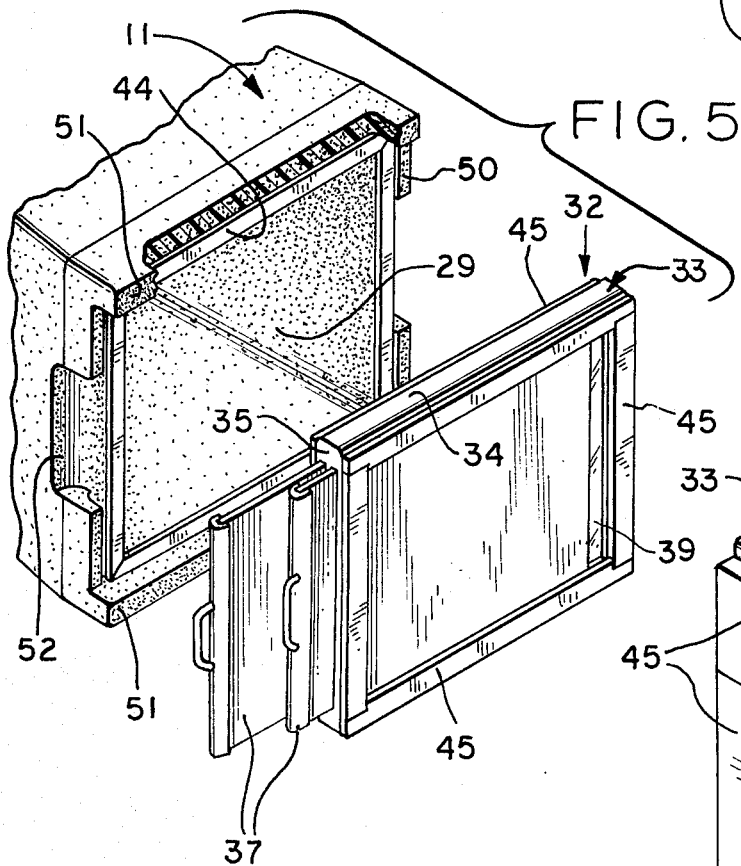
FIG. 5 is a fragmentary perspective view of the camera and showing in exploded relation the film cassette.

In order to assist in proper placement of the film cassette on the housing of the camera at the opening 29, vertically extending guide shoulders 50 are provided at the side walls 14 and 15 outside the magnet strip 44 and horizontally extending guide shoulders 51 are provided on the upper and lower walls 12 and 13 outside the magnet strip 44. Accordingly, the placement of the film cassette on the camera housing in the proper position can be quickly ascertained by the operator. Further, in order to assist removal of a film cassette from the camera housing, cutouts 52 are provided in the opposite side walls 14 and 15, as seen particularly in FIGS. 1 and 5. Further, the cutouts assist in permitting removal of the dark slides 37 when the film cassette is in mounted position on the camera housing.

In order to enable the adjustment of the lens system 20 during initial focusing, an access opening 55 is provided in the top wall 12 that is closed by an opaque cover plate 56. The cover plate 56 is made of magnetic material such as a metal, and a strip 57 of magnet material like the strip 44 is mounted around the access opening 54 to grip the cover plate 56 when in position over the access opening and also to prevent the loss of light through the access opening. A knob 58 is mounted on the cover plate 56 to assist in removal of the cover plate and replacement thereof relative the access opening 55.

It can therefore be seen the camera of the present invention provides a straight-through optical system having a unique mounting structure for quick and easy handling of film cassettes that assures a constant focal distance between the film plane and the face of the cathode-ray tube, so that the camera is always in focus.

It will be understood that modifications and variations may be effected without departing from the scope of the novel concepts of the present invention, but it is understood that this application is to be limited only by the scope of the appended claims.

The invention is hereby claimed as follows:

1. A camera for photographing a cathode-ray tube comprising a box having a lens mounted therein, a shielded opening on one side of the lens for attachment to a cathode-ray tube, a second shielded opening on the other side of the lens adapted to receive film means onto which an image may be received from the lens, said film means including a film cassette having peripherally mounted continuous magnetic means, and magnet means including a strip of resilient magnet material mounted on the box at said second shielded opening for receiving said magnetic means of said film cassette to magnetically mount the cassette on the box and to seal against light loss between the second opening and the cassette.

2. A camera as defined in claim 1, wherein said cassette includes first and second opposed sides and said magnetic means is provided on said sides of said cassette.

3. A camera as defined in claim 1, wherein guide means is provided on the box at the second opening for guiding placement of the cassette.

4. A camera for photographing a cathode-ray tube comprising a box for a lens mounted therein, a rectangular shielded opening on one side of the lens for attaching to a cathode-ray tube, a second rectangular shielded opening on the other side of the lens adapted to receive film means onto which an image may be received from the lens, said film means including a rectangular film cassette having peripherally mounted continuous magnetic means, said magnetic means including rectangularly shaped metal stripping, and magnet means mounted on the box at said second opening for receiving said magnetic means of said film cassette to magnetically mount the casette on the box and to seal against light loss between the second opening and the cassette, said magnet means including rectangularly shaped stripping of flexible magnet material and of substantially the same size as said metal stripping.

5. A camera as defined in claim 4, wherein said material is rubber base ethylene polypropylene diamene filled with barium ferride.

6. A camera for photographing the cathode-ray tube of an oscilloscope comprising a housing having top and bottom diverging walls and opposed diverging side walls defining an object opening at one end and a substantially larger film plane opening at the other end, a lens mounted within the housing for receiving the object image from the object opening and transmitting same to the film plane opening, a film cassette at the object opening, means mounting the film cassette to the housing to prevent light penetration between the housing and film cassette, said mounting means including magnet strip means on one of the housing or film cassette, said magnet means including a continuous strip of flexible magnet material, and magnetic means on the other of the housing or film cassette, said magnetic means including a strip of continuous magnetic material, and the engaging faces of the strips being flat.

7. A camera as defined in claim 6, wherein the entire face of the magnet material is coplanar and the entire face of the magnetic material is coplanar.

8. A camera as defined in claim 7, wherein guide means is provided on the housing for proper placement and alignment of the film cassette with the film plane opening.

* * * * *